Patented June 12, 1928.

1,673,356

UNITED STATES PATENT OFFICE.

HENRY B. HANLEY, OF ROCHESTER, NEW YORK, ASSIGNOR TO WHITEHEAD BROTHERS COMPANY, OF NEW YORK, N. Y., A CORPORATION OF NEW JERSEY.

CORE BINDER.

No Drawing. Application filed October 13, 1924. Serial No. 743,492.

My invention relates to the art of metal founding and has for its object the treatment of sulphite products by a simple and inexpensive method whereby their great affinity for water will be considerably lessened thereby making them more suitable as a binder for cores.

As is well known, sulphite liquor such as the concentrated waste sulphite liquor preparations now in long use in foundries readily absorb moisture so that if the cores for which they act as binders are not used immediately they will soften making them unsuitable for foundry work. After sulphite products are treated in accordance with my invention, however, their tendency to absorb moisture will be so small as not to be a disadvantage in foundry practice.

The invention consists in adding oil, preferably mineral oil, to the sulphite product and colloidizing the mixture, that is, disintegrating the oil and sulphite product into colloidal particles. This may be accomplished preferably by means of a machine provided with a member rotating at high speed, a surface of which rotates in accurate and close relation to the surface of a stationary member, the liquid mixture being forced through the space between said surfaces by the action of the rotating member acting like a centrifugal pump whereby the sulphite product and oil will be minutely disrupted and dispersed and expelled as a colloidal mist. This action breaks down or disintegrates the sulphite product and oil into colloidal particles and causes the particles to intimately commingle or coalesce whereby a thorough and lasting mixture of the two will obtain and they will remain in permanent suspension. The sulphite product will then considerably lose its affinity for water.

I have found that any well known commercial concentrated sulphite waste liquor preparation having a specific gravity of approximately 35° Baumé may be used in the proportions of about 75% to 90% by weight with oil from 25% to 10% by weight.

Before the mixture has been colloidized it will sometimes be found desirable to add a stabilizer, such as fish glue, from 1% to 3% by weight which acts to assist in keeping the colloidal particles of the sulphite preparation and oil in suspension.

It will also be found desirable, although not necessary, in some cases to add a small amount of any suitable binder, such as dextrine to the mixture for the reason that when oil is added to the sulphite preparation such as that described above some of its binding strength is lost. The binder is preferably added before colloidization of the mixture has been effected so that the oil, sulphite preparation and binder are colloidized together, the oil and sulphite preparation acting as a liquid medium to assist in the colloidization of the binder. I have found that an addition of approximately 5% dextrine by weight will materially increase the binding strength.

It is within the scope of my invention to use the waste sulphite liquor from the pulp mills or any neutralized and concentrated waste sulphite liquor or dried preparations made from them. When a dried preparation such as sulphite pitch is used, it is preferable to add water thereto until a specific gravity of about 35° Baumé is reached whereupon the above proportions will apply.

The terms "sulphite product" used herein and in the appended claims will be understood to include either sulphite liquor as such, neutralized and concentrated waste sulphite liquor or dried preparations made from them.

It will be understood that it is within the scope of my invention in some cases to omit the colloidization of the sulphite product and oil and to add to the mixture a clay-like material having high colloidal properties such for instance as bentonite. This material may be found in the State of Wyoming and it contains a large percentage of silica and a comparatively large percentage of alumina, the balance of the composition comprising ingredients of a low grade clay. The alumina and silica in the material combined as aluminum silicate is in free hydrated form in highly colloidal condition. Bentonite will be found to have a high dye test figure of a minimum of 25,000 and a maximum of approximately 60,000 and has an exceedingly high absorptive property. Because of these and other of its peculiar characteristics, when added to a mixture of sulphite product and oil it acts to cause the materials to remain mixed and to stay in suspension.

In using bentonite, the well known commercial concentrated sulphite waste liquor preparation referred to above may be employed, the percentages of the ingredients of the mixture by weight being approximately, sulphite preparation 85% to 68%, oil 10% to 25% and bentonite 5% to 7%. In this case a stabilizer and an additional binder, such as dextrine, may sometimes be dispensed with.

What I claim as my invention is:

1. A core binder comprising a sulphite product, oil, a stabilizer and a binder.

2. A core binder comprising a sulphite product, oil, fish glue and dextrine.

3. A core binder comprising a sulphite product, oil and bentonite.

4. A core binder comprising a sulphite product, oil and a clayey material having a dye test figure of a minimum of 25,000 and a maximum of approximately 60,000.

Signed at Rochester in the county of Monroe and State of New York this 22nd day of September, A. D. 1924.

HENRY B. HANLEY.